United States Patent [19]

Sasaki et al.

[11] Patent Number: 4,624,594
[45] Date of Patent: Nov. 25, 1986

[54] FLUID DISPENSER

[75] Inventors: Toshiyuki Sasaki, Tokyo; Tomozo Sekiguchi, Kawaguchi, both of Japan

[73] Assignee: Pentel Kabushiki Kaisha, Tokyo, Japan

[21] Appl. No.: 673,537

[22] Filed: Nov. 20, 1984

[30] Foreign Application Priority Data

Nov. 28, 1983 [JP] Japan ................. 58-222136
Nov. 29, 1983 [JP] Japan ................. 58-225199
Dec. 28, 1983 [JP] Japan ................. 58-249998
May 28, 1984 [JP] Japan ................. 59-106495
Jun. 28, 1984 [JP] Japan ................. 59-131986

[51] Int. Cl.$^4$ .................... B43K 5/06; B43K 5/16
[52] U.S. Cl. .................... 401/176; 401/110; 401/111; 401/172; 401/180
[58] Field of Search ............ 401/110, 111, 171, 172, 401/176, 177, 179, 180, 181, 194

[56] References Cited

U.S. PATENT DOCUMENTS 660,823 10/1900 Sherman ................. 401/176
2,218,536 10/1940 Klagges ................. 401/176

FOREIGN PATENT DOCUMENTS 1007198 10/1965 United Kingdom ................. 401/111

Primary Examiner—Richard J. Apley
Assistant Examiner—Alfedo Acoff
Attorney, Agent, or Firm—Wenderoth, Lind & Ponack

[57] ABSTRACT

A fluid dispenser according to the present invention has a tubular body having therein a fluid chamber, a pusher for pushing the fluid, and a feed mechanism for progressively advancing the pusher. The feed mechanism has a slider and an actuator for advancing the pusher so that a suitable amount of the fluid in the fluid chamber of the tubular body is fed to an outlet of the dispenser. The outlet may be in the form of a nib when the dispenser is in the form of a writing pen.

In a preferred embodiment of the invention, the feed mechanism has a nut fixed within the tubular body, a threaded rod threadedly engaged with the nut, a rotary member slidably mounted on the threaded rod and spring biased rearwardly towards the actuator, a slider for rotating the rotary member, and a guide device for guiding the rotary member and the slider. The guide device has grooves on the inner surface of the tubular body.

11 Claims, 31 Drawing Figures

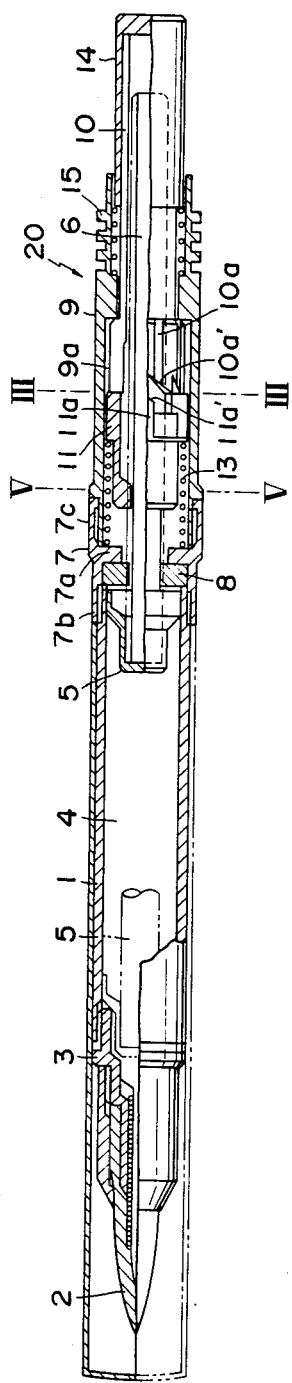
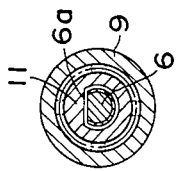
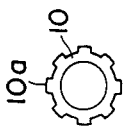
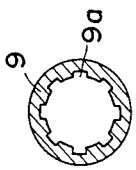
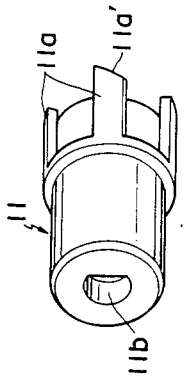

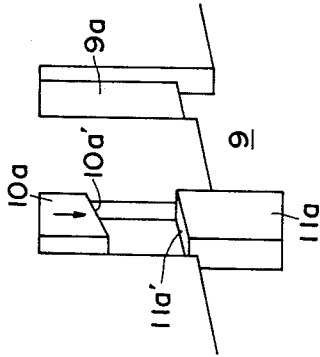
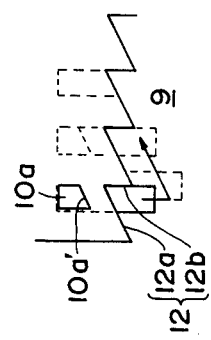
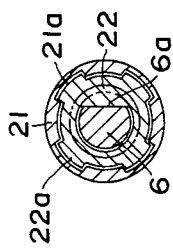
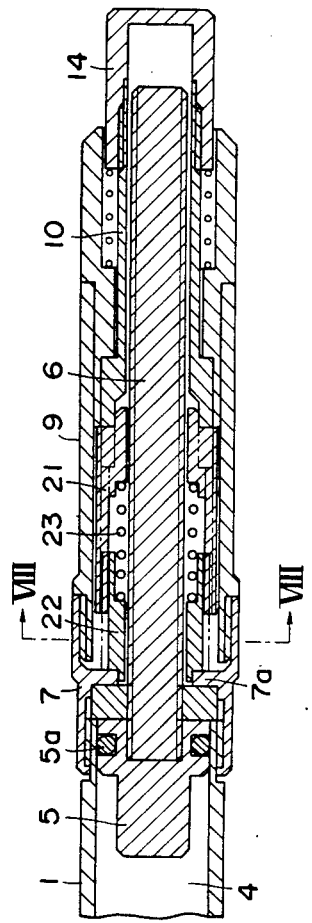

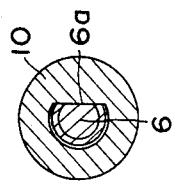
FIG. 10
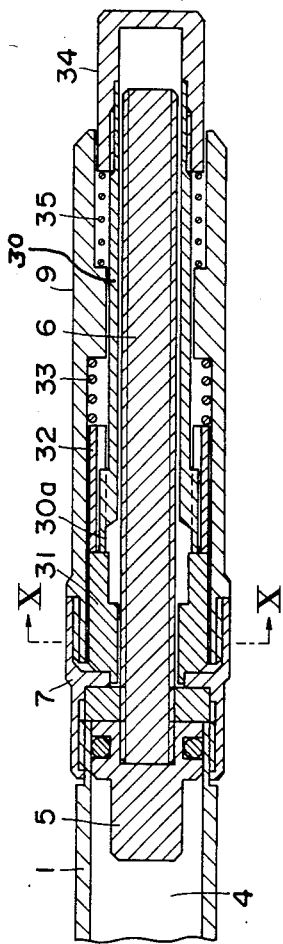
FIG. 9
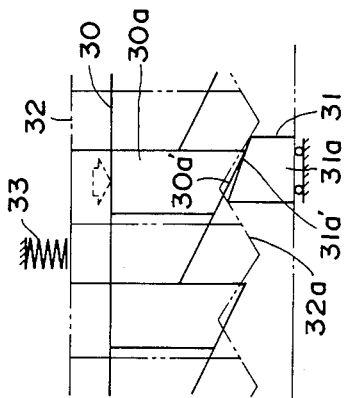
FIG. 11
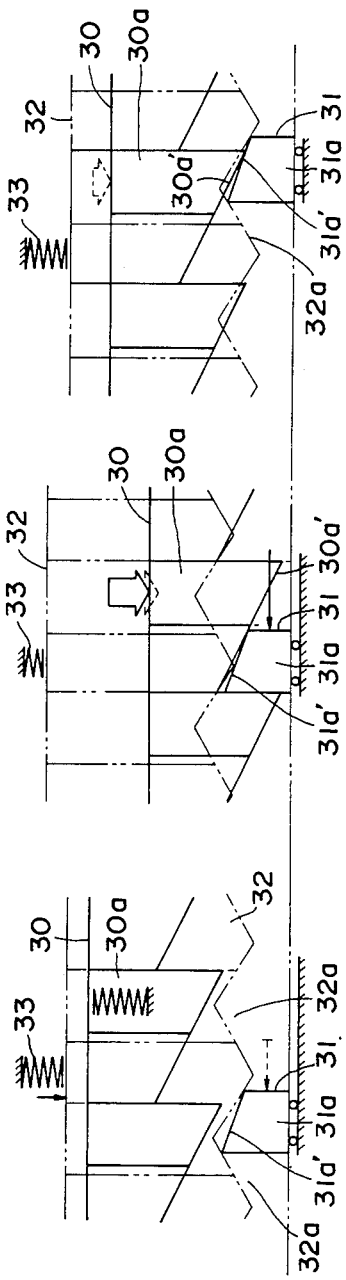
FIG. 12
FIG. 13

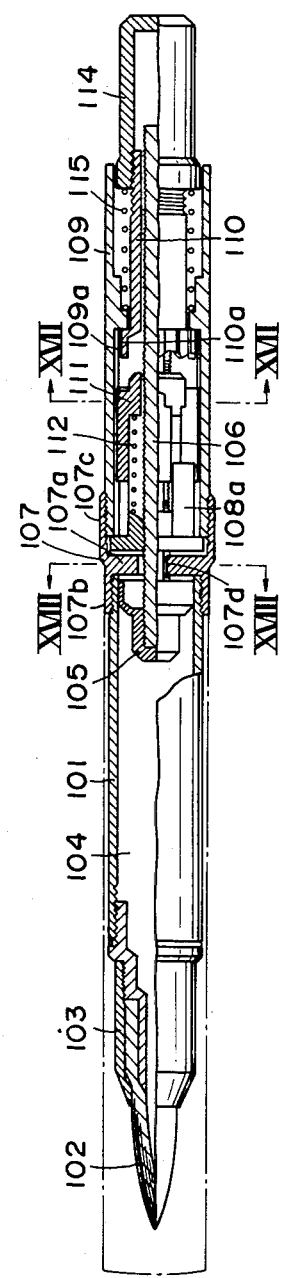
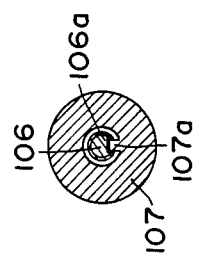
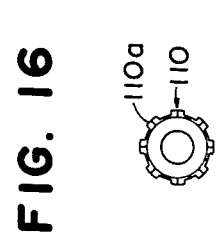
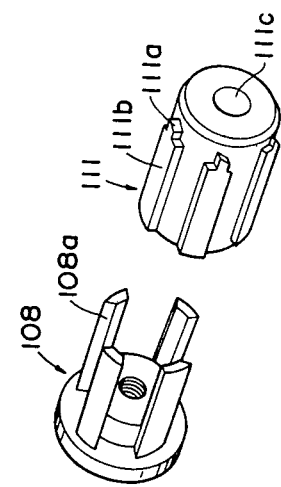

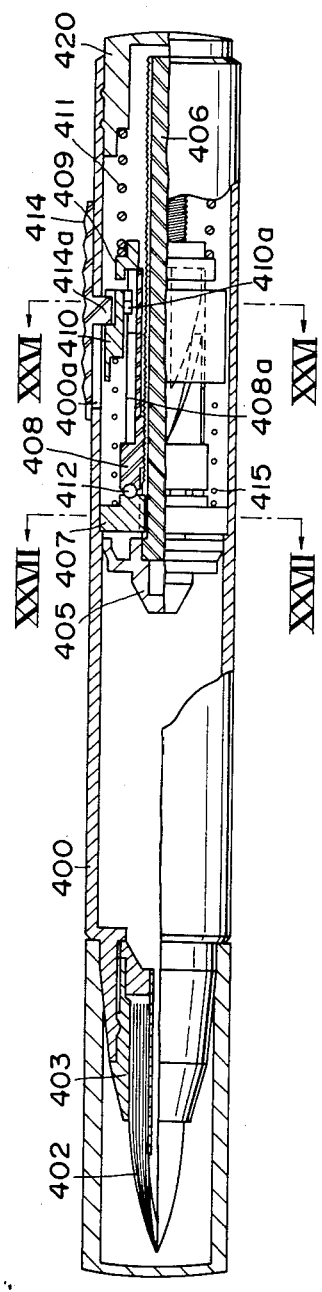
FIG. 25
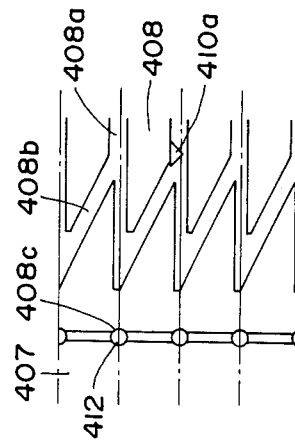
FIG. 28
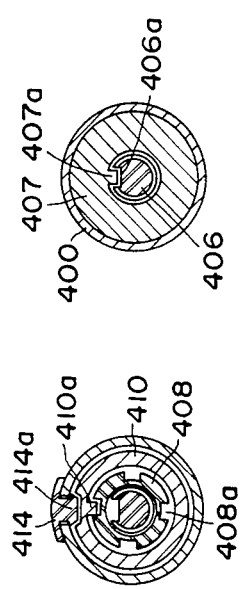
FIG. 27
FIG. 26

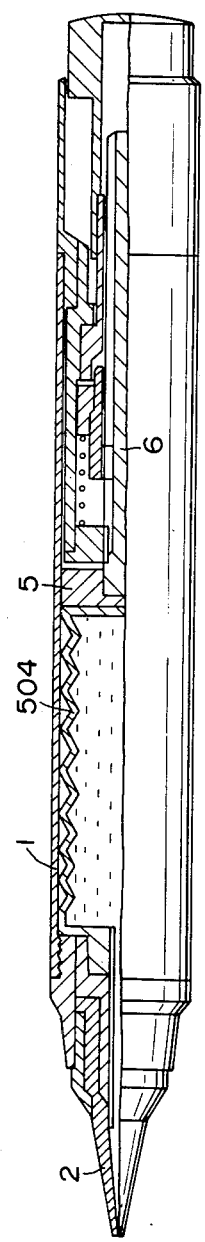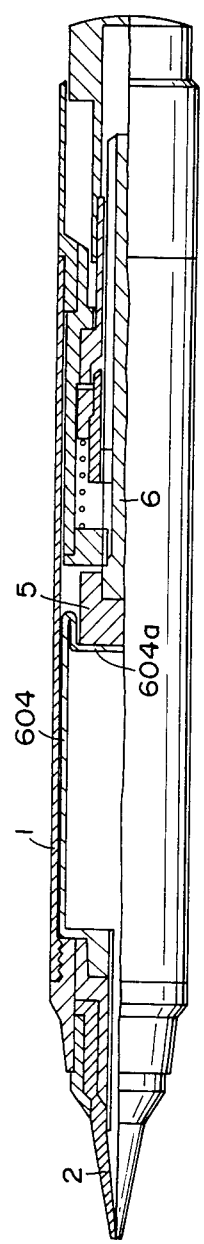

FLUID DISPENSER

BACKGROUND OF THE INVENTION

The present invention relates in general to a dispenser for dispensing or supplying a fluid contained in a chamber of the dispenser, and more particularly to a dispenser for permitting a predetermined amount of fluid to flow out of an outlet or nib of the dispenser by a simple manipulation of an actuator. The dispenser according to the present invention is applicable especially to, for example, cosmetic applicators such as eyeliners, nail-color applicators and lip color applicators, stationery items such as paste and paint applicators, flavoring material applicators such as mustard applicators, and other applicators which are generally used for dispensing a predetermined amount of material by a simple manipulation of the actuator thereof.

A conventional dispenser is disclosed in Japanese Utility Model Publication No. 50-10925, in which a rotatable rear tube is mounted on a front tube. By turning the rear tube relative to the front tube, a threaded rod is rotated simultaneously and advanced toward a fluid chamber within the dispenser so that the fluid is pressed by a piston on the rod to forcibly feed the fluid towards and then out of the outlet or nib which is provided at an end of the dispenser.

According to the conventional dispenser as described above, while the fluid contained within the fluid chamber of the dispenser is reliably fed to the outlet nib, on the other hand, it is troublesome to change the gripping posture of the dispenser when the rear tube is rotated for dispensing the material. When the rear tube is rotated, both hands must be used for operation of rotation. Additionally, the amount of the fluid must be carefully controlled by rotating the rear tube slowly, with the outcoming fluid being examined by visual observation.

SUMMARY OF THE INVENTION

A principal object of the present invention is to provide an improved fluid dispenser wherein the disadvantages inherent in the conventional ones are avoided.

Another object of the present invention is to provide a fluid dispenser which can dispense a fixed amount of fluid by a single and simple manipulation.

A further object of the present invention is to provide a new fluid dispenser wherein a feed mechanism is mounted for progressively advancing a pusher to push the fluid in the dispenser towards an outlet.

A fluid dispenser according to the present invention has a tubular body having therein a fluid chamber, a pusher for pushing the fluid, and a feed mechanism for progressively advancing the pusher. The feed mechanism has a slider and an actuator for advancing the pusher so that a suitable amount of the fluid in the fluid chamber of the tubular body is fed to an outlet of the dispenser. The outlet may be in the form of a nib when the dispenser is in the form of a writing pen.

In a preferred embodiment of the invention, the feed mechanism has a nut fixed within the tubular body, a rod threadedly engaged with the nut, a rotary member slidably mounted on the rod and spring biased rearwardly towards the actuator, a slider for rotating the rotary member, and a guide device for guiding the rotary member and the slider. The guide device has grooves on the inner surface of the tubular body.

In another preferred embodiment of the invention, the feed mechanism has a nut rotatably mounted within the tubular body, a rod threadedly engaged with the nut and slidably but non-rotatably mounted within the tubular body, a rotary member which is slidable relative to the nut and rotatable together with the nut, a slider for rotating the rotary member, and guide grooves, provided on the inner surface of the tubular body, for guiding the rotary member and the slider.

In a further embodiment of the present invention, the feed mechanism has a pusher, a rod threadedly engaged with the pusher and rotatably mounted within the tubular body, a rotary member spring biased and mounted on the rod, a slider for rotating the rotary member, and guide grooves for guiding the rotary member and the slider.

BRIEF DESCRIPTION OF THE DRAWINGS

FIG. 1 is a sectional view of a fluid dispenser according to a first embodiment of the invention, FIG. 2 is a perspective view of a rotary member forming part of the structure shown in FIG. 1, FIG. 3 is a sectional view of a tubular body taken along line III—III in FIG. 1, FIG. 4 is an end view of a slider in the structure shown in FIG. 1, FIG. 5 is a sectional view of the dispenser, taken along line V—V in FIG. 1, FIGS. 6A and 6B are explanatory diagrams showing an operation of the rotary mechanism of the slider shown in FIG. 4, FIG. 7 is a sectional view of part of the dispenser according to a second embodiment of the invention, FIG. 8 is a sectional view, taken along line VIII—VIII in FIG. 7, FIG. 9 is a sectional view of part of the dispenser according to a third embodiment of the present invention, FIG. 10 is a sectional view, taken along X—X in FIG. 9, FIGS. 11 to 13 are explanatory diagrams showing the operational mode of the slider in the rotary mechanism shown in FIG. 9, FIG. 14 is a sectional view of the fluid dispenser according to a fourth embodiment of the invention, FIG. 15 is an exploded perspective view of a rotary member and a nut in the structure shown in FIG. 14, FIG. 16 is a botton view of a slider of the structure shown in FIG. 14, FIG. 17 is a sectional view of a tubular body, taken along line XVII—XVII in FIG. 14, FIG. 18 is a sectional view of the dispenser, taken along line XVIII—XVIII in FIG. 14, FIGS. 19 to 21 are explanatory diagrams of the operation of the slider in the rotary mechanism shown in FIGS. 14 and 16, FIG. 25 is a sectional view of the fluid dispenser according to a seventh embodiment of the invention, FIG. 26 is a sectional view of the dispenser, taken along line XXVI—XXVI in FIG. 25, FIG. 27 is a sectional view of the dispenser, taken along line XXVII—XXVII in FIG. 25, FIG. 28 is an enlarged plan view of a portion of a ring and tubular cam body shown in FIG. 25, and FIGS. 29 and 30 are sectional views of the fluid dispenser according to further embodiments of the invention.

DETAILED DESCRIPTION OF PREFERRED EMBODIMENTS

Figures 19, 20, 21, 22, 23, 24:
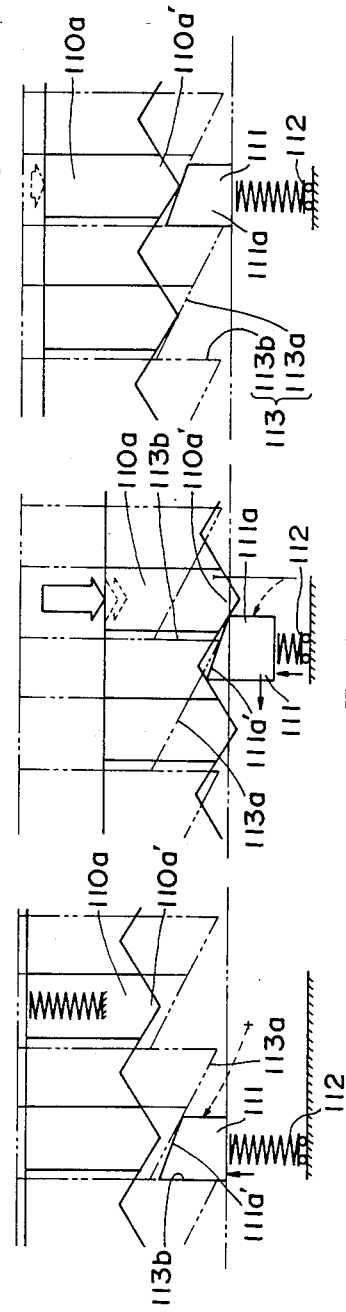
FIG. 22 is a sectional view of part of the dispenser according to a fifth embodiment of the present invention.
FIG. 23 is a perspective view of a rotary member in the structure of FIG. 22.
FIG. 24 is a sectional view of part of the dispenser according to a sixth embodiment of the invention.

Preferred embodiments of the present invention will be described with reference to the drawings, wherein for clarification only, the fluid dispenser in all embodiments is shown in the form of writing instrument having a longitudinal tubular body and a point or nib at one end thereof.

First Embodiment:

FIGS. 1 through 6A and 6B show a first embodiment of the present invention, wherein reference numeral 1 designates a front tube of a tubular body 20 of the fluid dispenser. The front tube 1 has an outlet, or a pen-like nib 2 held at its front end by a holder 3. As illustrated, the nib 2 is connected to the front tube 1 by the holder 3 so that a longitudinal liquid chamber 4 is formed within the front tube 1. The nib 2 is made of, for example, a natural or synthetic fiber bundle or sponges or any other materials having a capillary action. Within the fluid chamber 4 is disposed a piston 5 which is slidable longitudinally within the longitudinal liquid chamber 4. The piston 5 is connected to a threaded rod 6 which is threadedly engaged with a nut 8 so that the rod 6 can advance toward the nib 2 relative to the nut 8. The rod 6 has a longitudinal flat portion 6a along the entire length of the rod. The front tube 1 of the tubular body 20 is connected with a rear tube 9 by means of a connector 7. The connector 7 has at its middle portion a collar 7a, and a front bore portion 7b and a rear bore portion 7c, and both the bore portions 7b and 7c have threaded portions for engagement with the front tube 1 and the rear tube 9, respectively. The nut 8 is press-fitted to the collar 7a, as illustrated. On the inner surface of the rear tube 9, a plurality of longitudinal grooves 9a are formed at a constant interval, while a slider 10 has at its front outer portion a plurality of projections 10a at the same pitch as that of the grooves 9a so that the projections 10a can longitudinally slide along the respective grooves 10a. Thus, the slider 10 is slidable longitudinally within the rear tube 9. The projections 10a each have an inclined portion 10a' at the front end. Reference numeral 11 designates a tubular rotary member which has at its rear outer surface a plurality of projections 11a, similar to the aforementioned projections 10a of the slider 10. A plurality of recesses 12 each having a unidirectionally inclined portion 12a and a vertical portion 12b are formed on the inner surface of the rear tube 9 at the same pitch as the aforementioned grooves 9a so that an inclined rear end 11a' of the projections 11a abuts against the inclined portion 12a of the recesses 12, and the rotary member 11 is spring biased rearwardly by a spring 13 so that the rotary member 11 is contacted against the vertical portion 12b. Thus, the inclined rear end 11a' of the rotary member projection 11a extends into the longitudinal groove 9a, and the inclined portion 10a' of the slider projection 10a contacts against the inclined rear end 11a'. The rotary member 11 has a bore 11b which is substantially same shape as the rod 6 so that the rotary member can be rotated together with the rod 6. The slider 10 is connected with an actuator 14 projecting rearwardly from the rear tube 9 and spring biased by a spring 15.

Although the slider 10 is shown to have a unidirectionally inclined surface 11a' at the front end of the projections 10a in the illustrated embodiment, the slider 10 may have a bi-directional or wedge-shaped inclinations as in the structure of the fourth embodiment which will be described presently with reference to FIGS. 19–21.

The operation of the fluid dispenser shown in FIG. 1 will be described.

When the actuator 14 is pressed into the tubular body 20 by a simple manipulation, the slider 10 is pressed against the rotary member 11 such that the inclined portion 10a' of each of the slider projections 10a abuts against the inclined rear end 11a' of the corresponding rotary member projections 11a. Thus the rotary member 11 is pushed towards the connector 7 against the resilient force of the spring 13. When the rotary member 11 is advanced sufficiently that its inclined rear end 11a' passes beyond the front end of the vertical portion 12b, the rotary member 11 is automatically fed into an inclined portion 12a of the adjacently positioned recess 12 since the rotary member 11 is generally biased to be rotated by a force applied to the inclined rear end 11a' (FIGS. 6A and 6B).

Upon release of the thrust added to the actuator 14, the rotary member 11 is pressed rearwardly by means of the spring 13, and retracted while the inclined rear end 11a' of the projection 11a rotates along the inclined portion 12a of the recess 12 so that the rotary member 11 is retracted and rotated by one pitch until it contacts the vertical portion 12b of the recess 12. In the illustrated embodiment of FIG. 1, the spring 15 is disposed between the rear tube 9 and the actuator for the purpose of facilitating a smooth retraction of the slider 10 and the actuator 14, and this spring 15 can be omitted if these elements can be returned smoothly. By the rotation of the rotary member 11, the rod 6 is rotated unitarily while it is meshed with the nut 8 and advanced in accordance with the rotation thereof relative to the nut 8. Thus, the piston is advanced toward the outlet nib 2 to thereby feed the fluid within the chamber 4 into the outlet nib 2. Thus, a simple manipulation of the actuator can supply a predetermined amount of the fluid to the outlet nib for use.

When the actuator 14 is repeatedly pushed, the rod 6 is progressively advanced towards the outlet nib 2. After the rod 6 is fully advanced into the fluid chamber 4, the front tube 1 can be removed from the connector 7 and then the rod 6 can be pulled out of the fluid chamber 4 of the front tube 1 along with the nut 8. Then, the rod 6 which has been removed from the front tube 1 is again inserted into the rear tube 9, and a new front tube 1 filled with a new fluid is connected to the connector 7. Thus, the fluid dispenser is now filled with a new fluid for a continuous use.

Second Embodiment:

FIGS. 7 and 8 show the fluid dispenser structure according to a second embodiment of the invention. In FIG. 7 of the drawing a front tube, which can be considered to be similar to that of the first embodiment of FIG. 1, is omitted for the purpose of simplification only.

In the second embodiment, a rotary member 21, which is mounted within the rear tube 9 similar to the rotary member 11 of FIG. 1, has four longitudinal grooves 21a on the inner wall thereof, while a rotation ring 22 having four projections 22a is mounted such that the projections 22a are longitudinally slidably engaged with the grooves 21a of the rotary member 21. A spring 23 is disposed between the two rotary elements 21 and 22 so that the rotation ring 22 is urged against the collar of the connector 7. The rotation ring 22 is provided with a non-circular hole for inserting therethrough the threaded rod 6 of non-circular shape in cross section having a flattened portion 6a similar to the rod of FIG. 1. Thus, the rod 6 is slidable but non-rotatable relative to the rotation ring 22. In FIG. 7, reference numeral 5a represents an elastomeric ring for a sealing purpose.

In operation, the actuator, when pressed by a manipulation, pushes the rotary member 21 through the slider 10 toward the connector 7, and the rotary member 21 is rotated by one-pitch and retracted longitudinally to the original longitudinal position similar to the first embodiment of FIG. 1. The rotation ring 22 receives only a rotational force only and is then rotated. Thus, the rod 6 is simultaneously rotated to advance the piston 5 into the fluid chamber 4.

In the second embodiment shown in FIGS. 7 and 8, the rotation ring 22 is only rotated at the longitudinally fixed position, and therefore both the rotation ring 22 and the rod 6 are unitarily rotated until the rod 6 and the piston 5 are advanced to the forwardmost position to make the liquid chamber become empty. When the fluid in the chamber 4 is used up, the rod 6 can be pulled out of the rotation ring 22 mounted within the rear tube 9, and therefore, even though the actuator 14 is accidentally pushed at this moment, a harmful force is not added to the slider 10 and the rotary member 21 since the latter is freely rotated at this moment. Accordingly, the structure of the second embodiment shown in FIG. 7 can prevent any damages of the rotational mechanism in the dispenser. The other structure and operation are substantially similar to those of the embodiment of FIG. 1.

Third Embodiment:

Referring to FIGS. 9 through 13, a slider 30 connected to an actuator 34 has projections 30a, and a rotary member 31 has projections 31a. Also mounted within the rear tube 9 is a sliding tube 32 having longitudinal grooves 32a.

When the actuator 34 is pushed by a manipulation, an inclined end 30a' of the projections 30a of the slider 30 is contacted with a rear inclined portion 31a' of the projections 31a of the rotary member 31 to push rotary member 31 to urge the member 31 in the circumferential direction, as shown in FIG. 11. By the rotational force of the rotary member 31, the sliding tube 32 is longitudinally rearwardly moved against a resilient force of a spring 33, and the projection 31a of the rotary member 31 is rotated by one pitch and placed into the adjacently positioned grooves 32a. When the thrust applied to the slider 30 is released, the sliding tube 32 is moved forward by the spring force of the spring 33 to its original position to engage the rotary member 31.

Similar to the second embodiment of FIG. 7, the threaded rod 6 with the piston 5 can be removed from the rotary member 31, which is rotated directly by a force of the slider 30 and therefore the rod 6 with piston 5 can be advanced reliably regardless of the frictional resistance of the piston 5. The other structure and operation are considered to be substantially similar to those of the embodiment of FIG. 1.

Fourth Embodiment:

FIGS. 14 through 21 show another embodiment of the invention. The fluid dispenser in this embodiment has, similar to those of the previously described embodiments, a front tube 101 incorporating a pen-like outlet nib 102 through a holder 103 and a fluid chamber 104. Within the fluid chamber 104 is disposed a piston 105 which is slidable in the longitudinal direction and is connected with a threaded rod 106. Reference numeral 107 designates a connector which has a collar 107a, a front bore 107b for engagement of the front tube 101, and a rear bore 107c for emgagement of the rear tube 109. The rod 106 is threadedly engaged with a nut 108, which is rotatably positioned within the rear tube 109. The connector 107 has a projection 107d on the inner wall of the collar 107a for prevention of rotation and is engaged with a longitudinally flattened portion 106a of the rod 106. The rear tube 109 has on its inner wall a plurality of longitudinal grooves 109a at a constant interval for longitudinally slidably receiving a plurality of projections 110a formed on the outer surface of a slider 110. Thus, the slider 110 is longitudinally slidable along the grooves 109a. The projections 110a of the slider 110 have two-directional or wedge-shaped inclined surfaces 110a' at the forward end thereof. Reference numeral 111 is a rotary member, which has projections 111a corresponding to the aforesaid projections 110a of the slider 110. Between the adjacent four projections 111b of the rotary member 111, projections 108a of the nut 108 are longitudinaly slidably fitted, and the rotary member 111 is generally biased rearwardly by a spring 112. The threaded rod 106 is inserted through a bore 111c. On the inner wall of the rear tube 109 at the position of the longitudinal grooves 109a, recesses 113 composed of a unidirectionally inclined portion 113a and a vertical portion 113b are formed at the same pitch of the grooves 109a of the rear tube 109, and the inclined rear ends 111a' of the projections 111a of the rotary member 111 are contacted against the recesses 113. The inclined rear ends 111a' of the rotary member 111 extend into the longitudinal grooves 109a, and contact the wedge-shaped bidirectionally inclined portion 110a' of the slider projections 110a. The slider 110 is connected with an actuator 114 which is spring-biased rearwardly by means of a spring 115.

The operation of the device illustrated in FIG. 14 will be described with reference to FIGS. 14 and 19 to 21. When the actuator 114 is pushed against a resilient force of the spring 115, the slider 110 is pushed forward and the wedge-shaped inclined portion 110a' contacts and pushes the inclined rear ends 111a' of the rotary member projections 111a. When the rear ends 111a' travel beyond a front end of the vertical portion 113b, the rotary member projections 111a are placed into the neighboring inclined portion 113a of the recess 113 since the rotary member 111 is biased circumferentially.

When the thrust to the actuator 114 is released, the rotary member 111 is pushed rearwardly by the resilient force of the spring 112 while the inclined rear end 111a' of the rotary member 111 rotationally slide along the inclined portion 113a of the recess 113. Thus, the rotary member 111 is rotated one pitch until it contacts the vertical portion 113b of the recess 113. At this moment, since the rotary member projection 111b moves longitudinally along the nut projection 108a, the nut 108 receives only a rotational force of the rotary member 11, and thus the rod 106 is advanced a predetermined length by the rotation of nut 108. Thus, the piston 105 is advanced into the fluid chamber 104 of the front tube 101 to thereby feed a predetermined amount of the fluid toward the outlet nib 102 for use.

Repetition of the manipulation of the actuator 114 causes a progressive advancement of the rod 106 into the fluid chamber 104. When the fluid chamber becomes empty, the rod 106 can be removed from the nut 108. Thus, successive manipulation, if applied after the chamber becomes empty, will not cause any damage in the rotational mechanism such as the rotary member 111 and slider 110 since the slider 110 will rotate freely at this moment.

Fifth Embodiment:

FIGS. 22 and 23 show another embodiment of the present invention. A tubular body 200 having an outlet nib 202 mounted at its front end by a holder 203 incorporates therein a fluid chamber 204. Within the tubular body 200 a piston 205 is slidably mounted at the rear portion thereof, the piston having an elastomeric O-ring which is contacted with an inner wall of the tubular body 200. Reference numeral 206 designates a threaded rod which is threadedly engaged with a threaded groove 205b of the piston 205, and which is rotatably fitted in the central bore of the holder 203 and has a liquid passage groove 206a at its front end portion. The tubular body 200 has in its rear inner wall a plurality of longitudinal grooves 200a at a constant interval, while a slider 210 has a plurality of projections 210a at a constant interval and at the same pitch as that of the grooves 200a so that the slider 210 is longitudinally slidable along the longitudinal grooves 200a of the tubular body 200. The projections 210a have a unidirectionally inclined portion. A rotary member 211 has a plurality of projections 211a on its outer surface and inclined portions 211a' on the rear ends thereof. A recess, which corresponds to the recess 113 of FIG. 19, composed of a unidirectional, inclined portion (113a of FIG. 19) and a vertical portion (113b of FIG. 19) is formed at the forward end of each of the longitudinal grooves 200a. Between the rotary member 211 and the rod 206 is disposed a helical spring 212, which biases the rotary member 211 rearwardly towards an actuator 214. The inclined portion 211a' of the rotary member 211 are pressed against the inclined portion of the slider 210, and thus the projections 211a of the rotary member 211 are pressed against the aforementioned vertical portion of the recess, corresponding to the recess 113 of the embodiment of FIG. 19. Reference numeral 215 is a spring for biasing the actuator 214 in the rearward direction.

An operation of the device shown in FIGS. 22 and 23 is considered to be substantially similar to that of the device shown in FIGS. 19 to 21 (forth embodiment).

Sixth Embodiment:

FIG. 24 shows a further embodiment of the present invention. In this embodiment, a rotary member 311 and a threaded rod 306 are integral, and the unitary structure of the two elements 306 and 311 is rotatable at a predetermined position but not slidable in the longitudinal direction of a tubular body 300. Reference numeral 332 designates a sliding tube longitudinally slidably mounted within the tubular body 300, and the sliding tube 332 is biased forwardly by a spring 322.

When an actuator 314 is pressed, an inclined projection portion of the slider 310 pushes, similar to the operation of FIGS. 11 and 12, the inclined rear end portion of the rotary member 311, to thereby urge the rotary member 311 in a circumferential or rotational direction. The sliding tube 332 is pushed rearwardly by an inclined projection portion of the rotary member 311, and is fed backwardly against a resilient force of the spring 322. When the rotary member 311 is rotated, the projections thereof are placed into adjacently positioned recesses. When the thrust on the actuator 314 is released, the sliding ring 332 is fed forwardly and rotates the rotary member 311, similar to the embodiment of FIG. 13. By rotation of the rotary member 311, the unitary formed rod 306 is naturally rotated to advance the piston 305. The actuator 314 is retracted to its original position by means of the spring 315. The other structure and operation can be considered to be substantially similar to those of the previous embodiment of FIGS. 22 and 23.

Seventh Embodiment:

With reference to FIGS. 25 to 28 showing another embodiment of the invention, a tubular body 400 has at its front end an outlet nib 402 and a holder 403, and a liquid chamber 404 at a middle portion therein. Reference numeral 405 designates a piston longitudinally slidably mounted within the liquid chamber, and connected to a threaded rod 406 at its rear end. The rod 406 has a longitudinal groove 406a along its entire length, in which a projection 407a of a ring 407 fixed to the rear end of the fluid chamber 404 is engaged so that rotation of the rod is prevented. Reference numeral 408 designates a tubular cam which is meshed with the rod 406 and has a plurality of longitudinal grooves 408a and inclined grooves 408b connecting one groove 408a to the adjacent groove 408a. The tubular cam 408 is biased forwardly by a spring 411 disposed between a spring receiver 409 and an end plug 420, and a recess 408c of the tubular cam 408 is pressed against rigid balls received by a groove in the ring 407. Reference numeral 414 designates an actuator having a lug 414a which is fixed to a slider 410, the slider 410 being engaged with the longitudinal groove 408a of the tubular cam 408. The slider 410 has on its inner surface a projection 410a which is fitted in the longitudinal groove 408a of the tubular cam 408. A spring 415 is disposed between the ring 407 and the slider 410.

When the actuator button 414 is moved forward by a manipulation against a resilient force of the spring 415, the slider 410 is advanced and the projection 410a is fed into the cam groove 408b, and thus the tubular cam 408 is rotated against a frictional force with the rigid balls of the ring 407. Thus, the rod 406 meshed with the tubular cam 408 is advanced for a predetermined length, and at the same time the piston 405 is advanced into the liquid chamber 404 so that the liquid in the chamber 404 is fed to the outlet nib 402. Upon release of the actuator button 414, it is retracted to its original position by a force of the spring 415. At this moment, the tubular cam body 408 is spring-biased by the spring 411, and its front end recess 408c is contacted with the rigid balls 412, and the projection 410a is positioned such that it is fed into a nextly located cam groove 408b. By repeating the operation described above, the rod 406 is progressively advanced until the piston 45 abuts against a front end of the fluid chamber 404.

MODIFICATIONS:

FIGS. 29 and 30 show modifications of the fluid dispenser according to the present invention, wherein the liquid chamber is formed of a deformable or stretchable container 504, 604 of a suitable soft resin so that the rear container can be pressed and deformed by the piston 5 actuated by the rod 6. In FIG. 29, the liquid container 504 is in the form of bellows. In FIG. 30, the liquid container 604 is formed such that it is collapsible from the bottom 604a as it is pressed by the piston 5. The other structure and operation are substantially similar to those of the previous embodiments, and will be understood from the explanation thereof. In either case, the piston does not contact the fluid directly but pushes the liquid by way of the container. This structure can prevent a leakage of the liquid toward and into the mechanical structure adjacent thereto.

Although the present invention has been described with reference to the preferred embodiments, many modifications and alterations can be made within the spirit of the present invention.

What is claimed is:

1. A fluid dispenser comprising:
   a tubular body having an outlet nib at one end thereof, said tubular body having a liquid chamber therein for containing a liquid, said liquid chamber being connected to said outlet nib so that the liquid can be fed to said outlet nib when pressure is applied to liquid in said liquid chamber;
   a pushing device longitudinally slidably mounted within said tubular body and having means in said liquid chamber for applying pressure to the liquid in said liquid chamber when said pushing device is moved toward said outlet nib;
   feed means connected to said pushing device for progressively advancing said pushing device toward said outlet nib, said feed means having:
   a nut fixedly mounted in said tubular body at the rear of said pushing device,
   a threaded rod threadedly engaged with said nut,
   a rotary means longitudinally slidably engaged with said rod and engaged with said rod for rotating said rod and spring-biased in a direction away from said outlet nib,
   a slider in the form of a tube in facewise abutment against said rotary means for rotating said rotary means when moved toward said outlet nib, said slider having projections on the outer surface thereof, and
   guide groove means in said dispenser in which said projections of said slider are engaged for guiding said slider; and
   an actuation device connected to said feed means for moving said slider when said actuation device is actuated, whereby when said actuation device is actuated, said threaded rod is rotated for being moved forward toward said outlet nib through said nut, and said pushing device is progressively moved forward, thereby supplying liquid in said liquid chamber to said outlet nib.

2. The fluid dispenser as claimed in claim 1 wherein said guide groove means comprises means on the inner wall of said tubular body for defining said guide grooves, and said rotary means is a rotary member mounted on said threaded rod for being rotatable therewith.

3. The fluid dispenser as claimed in claim 1 wherein said guide groove means comprises means on the inner wall of said tubular body for defining said guide grooves, and said rotary means is a rotary member rotatably and slidably mounted on said threaded rod and with which said slider is engaged for sliding and rotating said rotary member, and is further constituted by a rotating tube in said tubular body with which said rotary member is slidably and rotatably engaged, said rotating tube being fixed in said tubular body against longitudinal movement therein and engaged with said threaded rod for rotating said threaded rod, and a spring disposed between said rotary member and said rotating tube for biasing said rotary member in the direction away from said outlet nib.

4. The fluid dispenser as claimed in claim 1 wherein said feed means further comprises a sliding tube around said slider and also in facewise abutment against said rotary means for rotating said rotary means when moved toward said outlet nib, and spring means engaged with said sliding tube for urging said sliding tube toward said outlet nib, and said guide groove means comprises means defining a plurality of grooves on the inside of said sliding tube.

5. The fluid dispenser according to claim 1, wherein said outlet nib is made of a material having a capillary action for a liquid to be used.

6. The fluid dispenser according to claim 1, said pushing device has a piston and a screw rod connected to said piston.

7. The fluid dispenser according to claim 1, wherein said fluid chamber has a flexible container made of a soft resin material.

8. A fluid dispenser comprising:
   a tubular body having an outlet nib at one end thereof, said tubular body having a liquid chamber therein for containing a liquid, said liquid chamber being connected to said outlet nib so that the liquid can be fed to said outlet nib when pressure is applied to liquid in said liquid chamber;
   a pushing device longitudinally slidably mounted within said tubular body and having means in said liquid chamber for applying pressure to the liquid in said liquid chamber when said pushing device is moved toward said outlet nib;
   feed means connected to said pushing device for progressively advancing said pushing device toward said outlet nib, said feed means having:
   a nut rotatably mounted within said tubular body at a longitudinally filed position therein,
   a threaded rod non-rotatably and longitudinally slidably mounted in said tubular body and threadedly engaged with said nut,
   a rotary means longitudinally slidable relative to said nut and engaged with said nut for rotating said nut when said rotary member is rotated,
   a slider in facewise abutment with said rotary member for rotating said rotary member when said slider is moved longitudinally toward said outlet nib, and guide means on the inner wall of said tubular body for defining a plurality of grooves in which said slider is engaged for guiding said slider; and
   an actuation device connected to said feed means for moving said slider when said actuation device is actuated, whereby when said actuation device is actuated, said rotary member is rotated to rotate said nut through a certain angle to advance said threaded rod, and said pushing device is progressively moved forward, thereby supplying liquid in said liquid chamber to said outlet nib.

9. A fluid dispenser comprising:
   a tubular body having an outlet nib at one end thereof, said tubular body having a liquid chamber therein for containing a liquid, said liquid chamber being connected to said outlet nib so that the liquid can be fed to said outlet nib when pressure is applied to liquid in said liquid chamber;
   a pushing device longitudinaly slidably mounted within said tubular body and having means in said liquid chamber for applying pressure to the liquid in said liquid chamber when said pushing device is moved toward said outlet nib;

feed means connected to said pushing device for progressively advancing said pushing device toward said outlet nib, said feed means having:

a threaded rod threadedly engaged with said pushing device and rotatably mounted within said tubular body, a rotary member, a spring connected between said threaded rod and said rotary member for transmitting the rotation of said rotary member to said threaded rod, a slider in facewise abutment with said rotary member for rotating said rotary member when said slider is moved longitudinally toward said outer nib, guide means on the inner wall of said tubular body for defining a plurality of grooves in which said slider is engaged for guiding said slider; and an actuation device connected to said feed means for moving said slider when said actuation device is, whereby when said actuation device is actuated, said rotary member is rotated to rotate said threaded rod through a certain angle to advance said pushing device progressively forward, thereby supplying liquid in said liquid chamber to said outlet nib.

10. A fluid dispenser as claimed in claim 9 further comprising a sliding tube around said slider and also in facewise abutment against said rotary member for rotating said rotary member when moved toward said outlet nib, and spring means engaged with said sliding tube for urging said sliding tube toward said outlet nib.

11. A fluid dispenser comprising:

a tubular body having an outlet nib at one end thereof, said tubular body having a liquid chamber therein for containing a liquid, said liquid chamber being connected to said outlet nib so that the liquid can be fed to said outlet nib when pressure is applied to liquid in said liquid chamber;

a pushing device longitudinally slidably mounted within said tubular body and having means in said liquid chamber for applying pressure to the liquid in said liquid chamber when said pushing device is moved toward said outlet nib;

feed means connected to said pushing device for progressively advancing said pushing device toward said outlet nib, said feed means having:

a threaded rod non-rotatably and longitudinally slidably mounted within said tubular body, a tubular cam body having a tubular cam on the outer surface thereof, said tubular cam body being threadedly engaged with said threaded rod and rotatably mounted at a longitudinally fixed position within said tubular body, and a slider engaged with said tubular cam for rotating said tubular cam when said slider is moved toward said outlet nib, said slider being spring-biased in a direction away from said outlet nib; and an actuation device connected to said feed means for moving said slider when said actuation device is actuated, whereby when said actuation device is actuated, said tubular cam is rotated to advance said threaded rod and said pushing device is progressively moved forward thereby supplying liquid in said liquid chamber to said outlet nib.

* * * * *